(12) United States Patent
Zhao et al.

(10) Patent No.: US 11,022,767 B2
(45) Date of Patent: Jun. 1, 2021

(54) TO-CAN CAP

(71) Applicant: Zhejiang Sunny Optical Co., Ltd, Ningbo (CN)

(72) Inventors: Qing Zhao, Ningbo (CN); Lingwei Chen, Ningbo (CN); Litong Song, Ningbo (CN); Yinfang Jin, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 0 days.

(21) Appl. No.: 16/864,311

(22) Filed: May 1, 2020

(65) Prior Publication Data

US 2020/0379195 A1 Dec. 3, 2020

(30) Foreign Application Priority Data

May 31, 2019 (CN) .......................... 201910467833.1

(51) Int. Cl.
*H04B 10/00* (2013.01)
*G02B 6/42* (2006.01)

(52) U.S. Cl.
CPC ......... *G02B 6/4263* (2013.01); *G02B 6/4206* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,333,224 A * | 7/1994 | Kikuchi | ............... | G02B 6/4204 385/93 |
| 5,511,140 A * | 4/1996 | Cina | .................... | G02B 6/4204 359/362 |
| 5,631,991 A * | 5/1997 | Cohen | .................. | G02B 6/4204 385/93 |
| 7,215,883 B1 * | 5/2007 | Lewis | .................. | H04B 10/077 398/17 |
| 7,348,203 B2 * | 3/2008 | Kaushal | ............... | B81B 7/0041 250/239 |
| 7,852,577 B2 * | 12/2010 | Kikuchi | ................. | G02B 7/022 359/819 |
| 9,505,647 B2 * | 11/2016 | Ogura | ...................... | G02B 7/02 |
| 10,050,410 B2 * | 8/2018 | Xu | ....................... | H01S 5/02212 |
| 10,317,633 B2 * | 6/2019 | Yu | ....................... | H01R 13/6581 |
| 2002/0110336 A1 * | 8/2002 | Dair | ...................... | G02B 6/4256 385/92 |
| 2002/0110338 A1 * | 8/2002 | Dair | ...................... | G02B 6/4246 385/92 |
| 2002/0150344 A1 * | 10/2002 | Chiu | .................... | G02B 6/3897 385/53 |
| 2003/0020998 A1 * | 1/2003 | Kuczynski | ........... | G02B 6/4253 359/245 |

(Continued)

*Primary Examiner* — Agustin Bello
(74) *Attorney, Agent, or Firm* — Sughrue Mion, PLLC

(57) ABSTRACT

The present disclosure provides a TO-CAN cap. The TO-CAN cap includes a casing, the casing has a hollow cylindrical structure, and an inner wall of the casing has a protrusion portion at a first end portion in an axial direction of the casing; and an optical lens, the optical lens has an optical portion for refracting light and a rib portion at a periphery of the optical portion, a side surface of the rib portion having a concave portion complementary to the protrusion portion, where the casing and the optical lens are connected to each other through the protrusion portion and the concave portion.

15 Claims, 3 Drawing Sheets

(56) References Cited

U.S. PATENT DOCUMENTS

| | | | |
|---|---|---|---|
| 2003/0197237 A1* | 10/2003 | Huang | H01L 31/02325 257/434 |
| 2004/0174618 A1* | 9/2004 | Kikuchi | C03B 11/08 359/811 |
| 2004/0184164 A1* | 9/2004 | Kikuchi | G02B 7/02 359/819 |
| 2005/0047785 A1* | 3/2005 | Hwang | H04J 14/0226 398/72 |
| 2005/0162758 A1* | 7/2005 | Tanaka | G02B 7/02 359/811 |
| 2005/0200979 A1* | 9/2005 | Nishihara | G02B 13/00 359/819 |
| 2006/0093011 A1* | 5/2006 | Vancoille | G02B 6/4214 372/101 |
| 2006/0114579 A1* | 6/2006 | Shibuya | G02B 7/028 359/811 |
| 2006/0139774 A1* | 6/2006 | Pfnuer | G02B 7/022 359/819 |
| 2009/0074357 A1* | 3/2009 | Teo | G02B 6/4207 385/36 |
| 2010/0238308 A1* | 9/2010 | Chang | H04N 5/2256 348/208.99 |
| 2013/0222908 A1* | 8/2013 | Yeh | H01S 5/0064 359/484.03 |
| 2014/0056592 A1* | 2/2014 | McColloch | H04B 10/40 398/135 |
| 2015/0043166 A1* | 2/2015 | Heo | H04B 10/0799 361/704 |
| 2015/0241636 A1* | 8/2015 | Ohata | G02B 6/4267 359/820 |
| 2015/0309272 A1* | 10/2015 | Cobb | G02B 6/4256 385/93 |
| 2016/0077302 A1* | 3/2016 | Amirkiai | G02B 7/02 359/819 |
| 2017/0093488 A1* | 3/2017 | Wang | G02B 6/4292 |
| 2017/0294390 A1* | 10/2017 | Hettier | H01L 23/564 |
| 2018/0003908 A1* | 1/2018 | Jung | H04B 10/564 |
| 2018/0113261 A1* | 4/2018 | Han | G02B 6/4215 |
| 2018/0210156 A1* | 7/2018 | Lin | G02B 6/4215 |
| 2019/0361181 A1* | 11/2019 | Law | G02B 6/4206 |
| 2020/0379195 A1* | 12/2020 | Zhao | G02B 6/4263 |

* cited by examiner

TO-CAN CAP

CROSS-REFERENCE TO RELATED APPLICATIONS

This application claims the priority from Chinese Patent Application No. 201910467833.1, filed in the National Intellectual Property Administration (CNIPA) on May 31, 2019, the disclosure of which is hereby incorporated by reference in its entirety.

TECHNICAL FIELD

The present disclosure relates to the field of optical elements, in particular to a TO-CAN cap.

BACKGROUND

With the development of technologies such as 5G communication and Internet of Things, the demand for high-performance optical modules for communication is increasing. Optical modules, as the main components of communications, also receive increasing requirements on the performance thereof in the industry. A typical optical communication device generally has following structure: optical chips are mounted to an optical communication components, the optical communication components are assembled into an optical communication module, and finally the optical communication module is applied to the optical communication device. In the field, TO-CAN caps are important optical coupling components in optical communications. During operation, light emitted from the optical luminescent device enclosed by the TO-CAN cap is converged by a lens in the cap and subsequently incident on the fiber end. The light incident on the optical fiber end is transmitted through the optical fiber, thereby realizing optical communication. The performance of the TO-CAN cap will affect the transmission effect of light.

SUMMARY

The present disclosure provides a TO-CAN cap. The TO-CAN cap includes: a casing, the casing having a hollow cylindrical structure, and an inner wall of the casing having a protrusion portion at a first end portion in an axial direction of the casing; and an optical lens, the optical lens having an optical portion and a rib portion, the optical portion being for refracting light and the rib portion being at a periphery of the optical portion, a side surface of the rib portion having a concave portion complementary to the protrusion portion, where the casing and the optical lens are connected to each other through the protrusion portion and the concave portion.

According to an implementation of the present disclosure, the casing includes: a first section, the first section being adjacent to the first end portion and having a first wall-thickness; and a second section, the second portion being connected to the first section and being away from the first end portion compared to the first section, the second section having a second wall-thickness less than the first wall-thickness.

According to an implementation of the present disclosure, the protrusion portion is located in the first section.

According to an implementation of the present disclosure, the surface of the optical portion of the optical lens is plated with an antireflection film.

According to an implementation of the present disclosure, both the object-side surface and the image-side surface of the optical lens are convex surfaces.

According to the an implementation of the present disclosure, the effective focal length of the optical lens is f, the radius of curvature of the image-side surface of the optical lens is R2, and $-1.3<f/R2<-0.7$ is satisfied.

According to the an implementation of the present disclosure, the edge thickness of the optical portion of the optical lens is ET, and the center thickness of the optical lens on the optical axis is CT, and $0.5<ET/CT<1$ is satisfied.

According to the an implementation of the present disclosure, the center thickness of the optical lens on an optical axis is CT, and the distance from an object-side surface of the optical lens to an image plane of the optical lens on the optical axis is TTL, and $0<CT/TTL<0.5$ is satisfied.

According to the an implementation of the present disclosure, the refractive index of the optical lens is Nd, and $1.6<Nd<1.9$ is satisfied.

According to an implementation of the present disclosure, the an abbe number of the optical lens is Vd, and $35<Vd<55$ is satisfied.

According to the an implementation of the present disclosure, the object distance of the optical lens is L1, the image distance of the optical lens is L2, and $0 \text{ mm}<L1+L2<6 \text{ mm}$ is satisfied.

According to an implementation of the present disclosure, the width of the protrusion portion in the axial direction of the casing is b, and $0.4 \text{ mm} \leq b \leq 0.9 \text{ mm}$ is satisfied.

According to an implementation of the present disclosure, the length of the first section is h, and $1.5 \text{ mm} \leq h \leq 2.0 \text{ mm}$ is satisfied.

According to an implementation of the present disclosure, the casing has a second end portion, the second end portion is opposite to the first end portion and has an annular flange on an outer wall of the second end.

The technical solution provided by the present disclosure achieves connecting and fixing of the casing to the optical lens without an adhesive, thereby reducing the assembly process and the cost.

BRIEF DESCRIPTION OF THE DRAWINGS

By describing non-limiting embodiments below in detail with reference to the accompanying drawings, other features, objectives and advantages of the present disclosure will be more apparent. In the accompanying drawings.

DETAILED DESCRIPTION OF EMBODIMENTS

Figure 1:
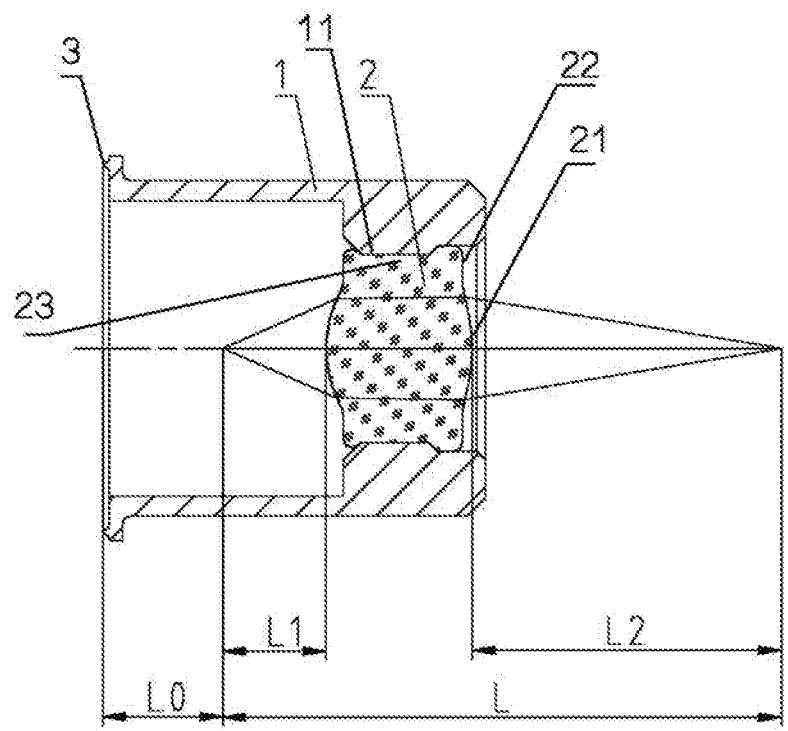
FIG. 1 is a schematic diagram illustrating the over-all structure of a TO-CAN cap according to an implementation of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements.

It should be noted that in the present specification, the expressions "upper", "lower", and the like are used solely to describe the relative positional relationship between the various features, and not to denote any limitation on the features. In addition, in the specification of the present disclosure, the ordinal numbers such as "first" and "second" are only used to distinguish different components, and is in no relation to the importance, order, or the like.

In the drawings, the thickness, size and shape of the lens have been slightly exaggerated for ease of illustration. In particular, the shape of the spherical or aspherical surface shown in the drawings is shown by way of example. That is, the shape of the spherical or aspherical surface is not limited to the shape of the spherical or aspherical surface shown in the drawings. The drawings are by way of example only and not strictly to scale.

In this context, if a surface of a lens is a convex surface and the position of the convex surface is not defined, it indicates that the surface of the lens is a convex surface at least in the paraxial region; if a surface of a lens is a concave surface and the position of the concave surface is not defined, it indicates that the surface of the lens is a concave surface at least in the paraxial region. The surface of each lens closest to the object is referred to as an object-side surface, and the surface of each lens closest to the image plane is referred to as an image-side surface.

It should be further understood that the terms "comprising," "including," "having," and variants thereof, when used in this specification, specify the presence of stated features, elements and/or components, but do not exclude the presence or addition of one or more other features, elements, components and/or combinations thereof. Expressions, such as "at least one of . . . ," when preceding a list of elements, modify the entire list of elements rather than the individual element in the list. Further, the use of "may," when describing the embodiments of the present disclosure, relates to "one or more embodiments of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

FIG. 1 shows an over-all structural diagram of a TO-CAN cap according to an embodiment of the present disclosure.

Figure 2:
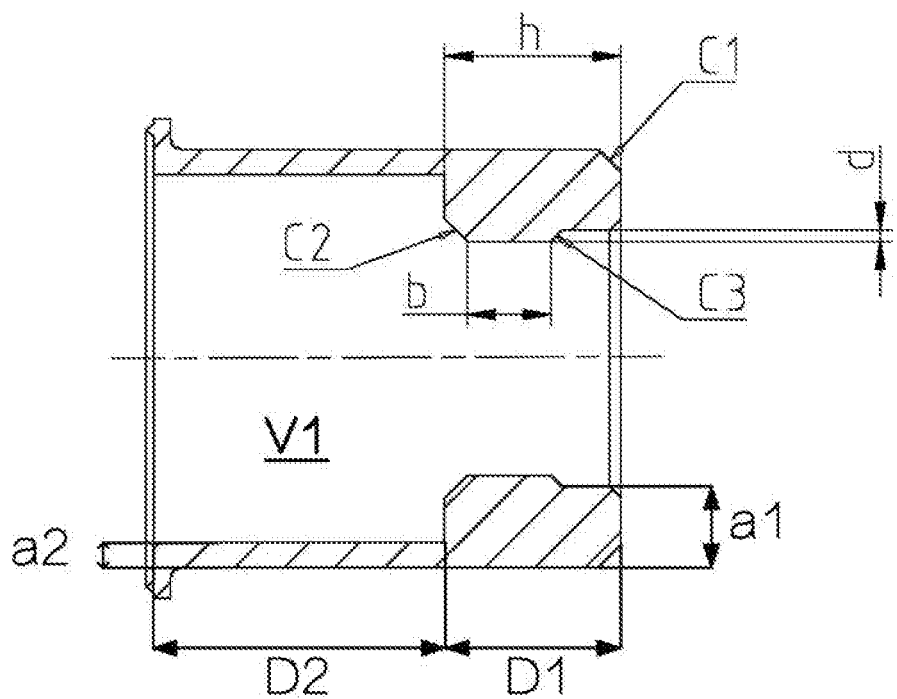
FIG. 2 is a schematic structural diagram of the casing in FIG. 1.

Referring to FIGS. 1 and 2, the TO-CAN cap provided by an implementation of the present disclosure includes a casing 1 and an optical lens 2. The casing 1 has a hollow cylindrical structure. The cylindrical structure may have an elongated shape and may have a variety of types of cross-sections depending on actual applications. For example, the casing 1 may have a cylindrical structure. The inner wall of the casing 1 has a protrusion portion 11 at the first end portion in the axial direction of the casing 1. The optical lens 2 has an optical portion 21 for refracting light and a rib portion 22 at the periphery of the optical portion, and the side surface of the rib portion 22 has a concave portion 23 complementary to the protrusion portion 11. The casing 1 and the optical lens 2 are connected to each other by the protrusion portion 11 and the concave portion 23. Therefore, the connecting and fixing of the casing to the optical lens can be achieved without an adhesive, thereby reducing the assembly process and the cost.

The casing 1 may be formed of a metallic material to facilitate heat dissipation. For example, the casing 1 may be formed of a stainless steel material, or may be formed of a metal coated with an oxide film. The casing 1 can be prepared, for example, by a turning process or a die casting process.

The optical lens 2 may be formed of glass or organic plastic and has a refractive power. For example, the optical lens 2 may be formed at one time by molding. The optical lens 2 may have a positive refractive power to converge the light passing through. Both the object-side surface and image-side surface of the optical lens 2 may be convex surfaces. With this configuration of the optical lens 2, a good beam coupling effect can be achieved, and a high beam coupling efficiency can be obtained.

As shown in FIG. 1, the working distance of the TO-CAN cap is L0. The object distance of the optical lens 2 is L1, the image distance of the optical lens 2 is L2, and the conjugate distance of the optical lens 2 is L. Specific values for each optical parameter are detailed below. According to an implementation of the present disclosure, an antireflective film may be plated on one or both surfaces of the optical lens 2 to increase the transmittance of light.

As shown in FIGS. 1 and 2, the casing 1 is divided into a first section D1 and a second section D2 in its axial direction. In both sections, the first section D1 near the first end portion has a first wall-thickness a1. The second section D2 is connected to the first section D1 and is away from the first end portion compared to the first section D1. The second section D2 has a second wall-thickness a2, where $a2<a1$. The protrusion portion 11 is located in the first section D1. As shown in FIG. 2, the casing 1 in the second section D2 partly surrounds to form a first accommodating space V1. The first accommodating space V1 has a volume larger than that for accommodating the optical lens 2, in order to accommodate a light emitting device, such as a laser transmitter.

An annular flange 3 is formed on the outer wall of the second end portion of the casing 1, the second end portion is opposite to the first end portion. The annular flange 3 may be used to form a sealed portion with the mating components, to ensure air tightness of the interior of the cap.

As shown in FIG. 2, the length of the first section D1 is h, where $1.5 \text{ mm} \leq h \leq 2.0 \text{ mm}$. The outer edge of the first section D1 has a chamfer C1. The chamfer C1 may have an inclination angle of 45°, and its right-angle side may have a length of 0.2 mm. The protrusion portion 11 has chamfers C2 and C3 on two sides thereof. Similar to the chamfer C1, the chamfer C2 and the chamfer C3 may have an inclination angle of 45°, and the chamfer C2 may have a right-angle side of 0.2 mm, while the chamfer C3 may have a right-angle side of 0.1 mm. The length of the inner wall of the protrusion portion 11 is b, where $0.4 \leq b \leq 0.9$ mm. The length of the distance between the inner surface of the protrusion portion 11 and the inner surface of the first section D1 at the first end portion is d. When the inner surface of the first section D1 at the first end portion is flush with one apex of the chamfer C3, $d=0.1$ mm.

According to an implementation of the present disclosure, the effective focal length of the optical lens is f, the radius of curvature of the image-side surface of the optical lens is R2, and −1.3<f/R2<−0.7 is satisfied. By controlling the ratio of effective focal length f to the radius of curvature R2 of image-side surface, the wave-front aberration can be better corrected, and a higher coupling efficiency is obtained.

According to an implementation of the present disclosure, the edge thickness of the optical portion of the optical lens is ET, and the center thickness of the optical lens on the optical axis is CT, and 0.5<ET/CT<1 is satisfied. By controlling the ratio of the edge thickness ET to the center thickness CT, the optical lens has better processability and is favorable for controlling the surface type error in the actual processing.

According to an implementation of the present disclosure, the center thickness of the optical lens on the optical axis is CT, and the distance from the object-side surface of the optical lens to the image plane of the optical lens on the optical axis is TTL, and 0<CT/TTL<0.5 is satisfied. The ratio of the central thickness CT to the total length TTL is controlled to facilitate the structural fit between the lens and the casing and to obtain better air tightness.

According to an implementation of the present disclosure, the refractive index of the optical lens is Nd and satisfies 1.6<Nd<1.9. By controlling the refractive index Nd of the optical lens, the optical spherical aberration of the system can be well corrected, and a high coupling efficiency is obtained.

According to an implementation of the present disclosure, the abbe number of the optical lens is Vd and satisfies 35<Vd<55. By controlling the abbe number Vd of the optical lens, the chromatic aberration can be well corrected, and laser emitters in different wavelength ranges are took into account.

According to an implementation of the present disclosure, the object distance of the optical lens is L1, the image distance of the optical lens is L2, and 0 mm<L1+L2<6 mm is satisfied. By controlling the length of L1+L2, the laser transmitter can be better matched to the NA (numerical aperture) of the receiving fiber, thereby obtaining a higher coupling efficiency. Furthermore, with this configuration, the arrangement of the device structures inside the TO-CAN cap is more reasonable.

According to an implementation of the present disclosure, at least one of the object-side surface and image-side surface of the optical lens may be an aspherical surface. The aspheric lens is characterized in that the curvature varies continuously from the center of the lens to the periphery of the lens. Unlike spherical lenses having a constant curvature from the center of the lens to the periphery of the lens, aspheric lenses have better radius of curvature characteristics and good optical characteristics.

Although embodiments of the present disclosure illustrates only one lens, it will be appreciated by those skilled in the art that the number of optical lenses may be varied without departing from the concept of present disclosure. For example, although one optical lens has been described in the implementations, the TO-CAN cap is not limited to including one lens. If desired, the TO-CAN cap may also include other numbers of lenses.

Embodiments 1-3 of an optical lens applicable to the TO-CAN cap of the above-described implementations are further described below with reference to FIGS. 3 to 5.

Embodiment 1

Figure 3:
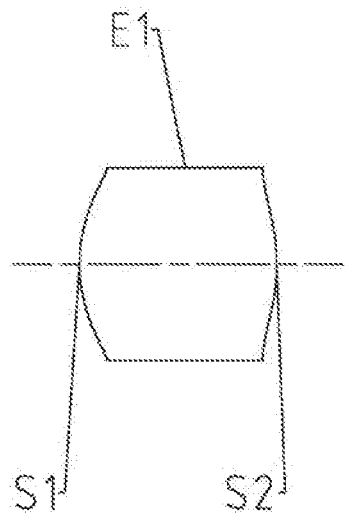
FIG. 3 illustrates a schematic diagram illustrating the optical lens in Embodiment 1 of the present disclosure.

FIG. 3 shows a schematic diagram of an optical lens of Embodiment 1. As shown in FIG. 3, the optical portion of the optical lens includes an object-side surface S1 and an image-side surface S2. In Embodiment 1, the object-side surface S1 is a convex surface and the image-side surface S2 is a convex surface. The optical lens has a positive refractive power, with an effective focal length f=1.19 mm and the total track length TTL=5.08 mm. The thickness E1 of the optical lens is 1.63 mm. The parameters of the optical lens of Embodiment 1 are shown in Table 1 below.

TABLE 1

| Embodiment 1: f = 1.19 mm; TTL = 5.08 mm | | | | | | |
|---|---|---|---|---|---|---|
| | | | | Material | | conic |
| Surface Number | Surface type | radius of curvature | Thickness | refractive index | abbe number | coefficient |
| OBJ | spherical | infinite | 1.1500 | | | |
| S1 | aspheric | 1.2329 | 1.6300 | 1.78 | 40.9 | 0.9328 |
| S2 | aspheric | −1.6224 | 3.4500 | | | 2.3280 |
| IMA | spherical | infinite | | | | |

In Embodiment 1, both the object-side surface S1 and the image-side surface S2 of the optical lens are aspherical surfaces, and the surface type x of the optical lens can be defined by but is not limited to the following aspherical formula:

$$x = \frac{ch^2}{1 + \sqrt{1 - (k+1)c^2h^2}} + \Sigma\, A_i h^i \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 2 above); and $A_i$ is the correction coefficient of the $i^{th}$ order of the aspheric surface.

Table 2 below shows the high-order coefficients A4, A6, A8, A10 applicable to the aspheric surfaces S1 and S2 in Embodiment 1.

TABLE 2

| Surface Number | A4 | A6 | A8 | A10 |
|---|---|---|---|---|
| S1 | −1.2853E−01 | −5.5657E−01 | 1.7379E+00 | −2.0931E+00 |
| S2 | 2.5497E−01 | −9.6548E−02 | 4.3053E−01 | 8.3096E−02 |

Example 2

Figure 4:
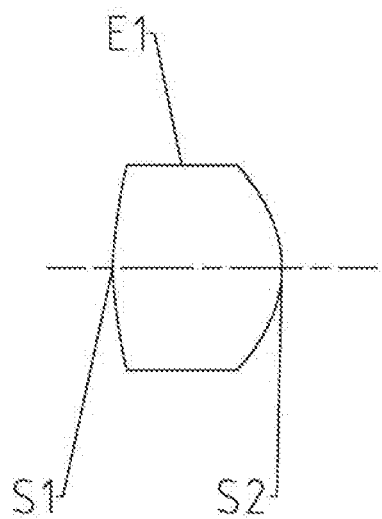
FIG. 4 is a schematic diagram illustrating the optical lens in Embodiment 2 of the present disclosure.

FIG. 4 shows a schematic diagram of an optical lens of Embodiment 2. As shown in FIG. 4, the optical portion of the optical lens includes an object-side surface S1 and an image-side surface S2. In Embodiment 2, the object-side surface S1 is a convex surface and the image-side surface S2 is a convex surface. The optical lens has a positive refractive power, with an effective focal length f=1.20 mm and the total track length TTL=5.23 mm. The thickness E1 of the optical lens is 1.40 mm. The parameters of the optical lens of Embodiment 2 are shown in Table 3 below.

TABLE 3

Embodiment 2: f = 1.20 mm; TTL = 5.23 mm

| Surface Number | surface type | radius of curvature | Thickness | Material refractive index | abbe number | conic coefficient |
|---|---|---|---|---|---|---|
| OBJ | spherical | infinite | 1.0000 | | | |
| S1 | aspheric | 1.8476 | 1.4000 | 1.67 | 53.1 | −3.7324 |
| S2 | aspheric | −0.9978 | 3.8299 | | | −0.0028 |
| IMA | spherical | infinite | | | | |

Table 4 below shows the high order term coefficients A4, A6, A8, A10 applicable to the aspheric surfaces S1 and S2 in Embodiment 2.

TABLE 4

| Surface Number | A4 | A6 | A8 | A10 |
|---|---|---|---|---|
| S1 | −2.7902E−01 | 2.4078E−01 | 0.0000E+00 | 0.0000E+00 |
| S2 | 1.1832E−01 | 3.9078E−02 | 3.0802E−02 | 7.6614E−02 |

Embodiment 3

Figure 5:
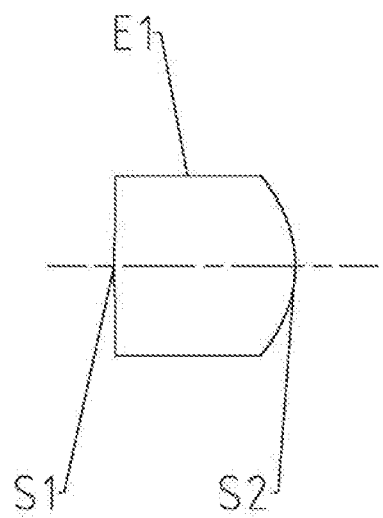
FIG. 5 illustrates a schematic diagram illustrating the optical lens in Embodiment 3 of the present disclosure.

FIG. 5 shows a schematic diagram of an optical lens of Embodiment 3. As shown in FIG. 5, the optical portion of the optical lens includes an object-side surface S1 and an image-side surface S2. In Embodiment 3, the object-side surface S1 is a convex surface and the image-side surface S2 is a convex surface. The optical lens has a positive refractive power, with an effective focal length f=1.16 mm and the total track length TTL=5.38 mm. The thickness E1 of the optical lens is 1.50 mm. The parameters of the optical lens of Embodiment 3 are shown in Table 5 below.

TABLE 5

Embodiment 3: f = 1.16 mm; TTL = 5.38 mm

| Surface Number | surface type | radius of curvature | Thickness | Material refractive index | abbe number | conic coefficient |
|---|---|---|---|---|---|---|
| OBJ | spherical | infinite | 0.8500 | | | |
| S1 | aspheric | 6.2054 | 1.5000 | 1.83 | 40.6 | 0.0000 |
| S2 | aspheric | −1.0071 | 3.8799 | | | −0.0263 |
| IMA | spherical | infinite | | | | |

Table 6 below shows the high order term coefficients A4, A6, A8, A10 applicable to the aspheric surfaces S1 and S2 in Embodiment 3.

TABLE 6

| Surface Number | A4 | A6 | A8 | A10 |
|---|---|---|---|---|
| S1 | 3.3996E−01 | −2.3843E+00 | −3.7094E+00 | 0.0000E+00 |
| S2 | 1.4270E−01 | 9.9845E−02 | −3.8975E−01 | 3.5345E−01 |

In summary, the parameters of the TO-CAN caps in Embodiments 1 to 3 satisfy the relationships shown in Table 7, respectively.

TABLE 7

| Conditional Expression | Embodiment 1 | Embodiment 2 | Embodiment 3 |
|---|---|---|---|
| f/R2 | −0.74 | −1.20 | −1.15 |
| ET/CT | 0.77 | 0.65 | 0.80 |
| CT/TTL | 0.32 | 0.27 | 0.28 |
| Nd | 1.78 | 1.67 | 1.83 |
| Vd | 40.9 | 53.1 | 40.6 |
| L1 | 1.15 | 1.00 | 0.85 |
| L2 | 3.45 | 3.83 | 3.88 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A TO-CAN cap, comprising:
   a casing, the casing having a hollow cylindrical structure, and an inner wall of the casing having a protrusion portion at a first end portion in an axial direction of the casing; and
   an optical lens, the optical lens having an optical portion and a rib portion, the optical portion being for refracting light and the rib portion being at a periphery of the optical portion, a side surface of the rib portion having a concave portion complementary to the protrusion portion,
   wherein the casing and the optical lens are connected to each other through the protrusion portion and the concave portion, and
   an effective focal length of the optical lens is f, a radius of curvature of an image-side surface of the optical lens is R2, and −1.3<f/R2<−0.7 is satisfied.

2. The TO-CAN cap according to claim 1, wherein the casing comprises:
   a first section, the first section being adjacent to the first end portion and having a first wall-thickness; and
   a second section, the second section being connected to the first section and being away from the first end portion compared to the first section, the second section having a second wall-thickness less than the first wall-thickness.

3. The TO-CAN cap according to claim 2, wherein the protrusion portion is located in the first section.

4. The TO-CAN cap according to claim 1, wherein a surface of the optical portion of the optical lens is plated with an antireflection film.

5. The TO-CAN cap according to claim 1, wherein an object-side surface and the image-side surface of the optical lens are convex surfaces.

6. The TO-CAN cap according to claim 1, wherein an edge thickness of the optical portion of the optical lens is ET, a center thickness of the optical lens on an optical axis is CT, and 0.5<ET/CT<1 is satisfied.

7. The TO-CAN cap according to claim 1, wherein a center thickness of the optical lens on an optical axis is CT, and a distance from an object-side surface of the optical lens to an image plane of the optical lens on the optical axis is TTL, and 0<CT/TTL<0.5 is satisfied.

8. The TO-CAN cap according to claim 1, wherein a refractive index of the optical lens is Nd, and 1.6<Nd<1.9 is satisfied.

9. The TO-CAN cap according to claim 1, wherein an abbe number of the optical lens is Vd, and 35<Vd<55 is satisfied.

10. The TO-CAN cap according to claim 1, wherein an object distance of the optical lens is L1, an image distance of the optical lens is L2, and 0 mm<L1+L2<6 mm is satisfied.

11. The TO-CAN cap according to claim 1, wherein a width of the protrusion portion in the axial direction of the casing is b, and 0.4 mm≤b≤0.9 mm is satisfied.

12. The TO-CAN cap according to claim 2, wherein a length of the first section is h and satisfies 1.5 mm≤h≤2.0 mm.

13. The TO-CAN cap according to claim 1, wherein the casing has a second end portion, the second end portion is opposite to the first end portion and has an annular flange on an outer wall of the second end portion.

14. The TO-CAN cap according to claim 2, wherein an outer edge of the first section has a chamfer, the chamfer has an inclination angle of 45°, and a right-angle side of the chamfer has a length of 0.2 mm.

15. The TO-CAN cap according to claim 1, wherein the protrusion portion has chamfers on two sides thereof, each of the chamfers has an inclination angle of 45°, where a chamfer adjacent to a second section in the chamfers has a right-angle side of 0.2 mm, and a chamfer away from the second section in the chamfers has a right-angle side of 0.1 mm.

* * * * *